United States Patent Office 3,657,423
Patented Apr. 18, 1972

3,657,423
CHICKEN FEED COMPOSITION CONTAINING FLY ASH FOR WEIGHT GAIN
Harold Yacowitz, Piscataway, N.J., assignor to The Amburgo Company, Incorporated, Philadelphia, Pa.
No Drawing. Continuation-in-part of application Ser. No. 706,686, Feb. 19, 1968. This application Nov. 18, 1970, Ser. No. 90,779
Int. Cl. A61k 27/00
U.S. Cl. 424—127     5 Claims

ABSTRACT OF THE DISCLOSURE

An improved chicken feed composition may be made by substituting ½ to 5 weight percent of fly ash for an equal weight of corn meal in a conventional corn meal type feed. The improved feed may be relatively easily pelleted and requires a lower ratio of pounds of feed to achieve a given degree of animal weight gain. The feed may also contain a small amount of binder for the fly ash to reduce dust.

---

This aplication is a continuation-in-part of my copending application S.N. 706,686, filed Feb. 19, 1968, and now abandoned.

The present invention is directed to chicken feed, and more particularly to a chicken feed which includes from ½ to 5 weight percent of fly ash.

The economics of poultry raising are highly competitive, and the profit margins from poultry operations are very low. There has been a pronounced effort to reduce the cost of poultry feeds without an impairment of nutritional factors.

A problem in connection with conventional corn meal poultry feeds has been the difficulty of pelleting such feeds. Thus, the nature of such feeds has been such as to render high-speed pelleting difficult, due to the tendency of the feeds to clog the pelleting machines.

This invention has as an object the provisions of a new and useful chicken feed.

This invention has an another object the provision of a chicken feed in which a lower ratio of pounds of feed is required to achieve a given degree of pounds of weight gain.

This invention has as still another object the provision of a chicken feed of the corn meal type which is relatively easy to pelletize using conventional pelleting equipment.

This invention has an another object the provision of a relatively low-cost chicken feed which is capable of producing relatively low ratios of pounds of feed per pound of weight gain in chickens.

Other objects will appear hereinafter.

The chicken feed composition of the present invention comprises a conventional corn meal type feed in which a proportionate amount of the corn meal is replaced with between about ½ to 5 weight percent (based on the total weight of the feed) of fly ash.

Fly ash is the very fine ash produced by the combustion of powdered coal with forced draft. It is recovered from flue gases by dust control equipment, such as electrostatic precipitators, like the Cottrell precipitator.

Because of the dusty nature of the fly ash used in the chicken feed composition of the present invention, it is contemplated that from about one-half to 2 weight percent of a non-toxic, highly viscous organic liquid (based on the weight of the fly ash) having a viscosity at least as great as that of propylene glycol may be used as a binder. Such binders may include propylene glycol itself, white mineral oil, melted saturated animal fat and the like.

The composition of the fly ash from a given industrial installation will vary depending on the source of the coal and the conditions of combustion. Generally, the fly ashes which can be used in the chicken feed compositions of the present invention have the following analyses after being ignited at 950° C. for one hour:

| Oxide: | Weight percent |
|---|---|
| $SiO_2$ | 25–80 |
| $Al_2O_3$ | 1.5–50 |
| $Fe_2O_3$ | 5–22 |
| $MgO$ | 0.5–3 |
| $CaO$ | 0–6 |
| $TiO_2$ | 0.5–4 |
| $BaO$ | 0–1 |
| $SrO$ | 0–1 |
| $SO_3$ | 0–10 |
| $Na_2O$ | 0–10 |
| $P_2O_5$ | 0–5 |
| $K_2O$ | 0.5–4 |

In the chicken feed examples set forth below, the fly ash was derived from Boone County, West Virginia coal, and was from the stack of the Richmond, Virginia plant of the Virginia Coal and Iron Company. Its particle size after grinding by Virginia Coal and Iron Company was 99 weight percent through 20 mesh, with the typical screening sift test being:

| Screen: | Weight percent |
|---|---|
| #20 | 0.54 |
| #40 | 30.69 |
| #60 | 47.40 |
| #80 | 2.57 |
| #100 | 0.98 |
| thru 100 pan | 15.26 |
| Percent recovery | 97.44 |

A typical analysis of the foregoing fly ash was a 59.3 weight percent loss on ignition at 950° C. for one hour, with the following oxides being present in the ignited sample:

| Oxide: | Weight percent |
|---|---|
| $SiO_2$ | 52.0 |
| $Al_2O_3$ | 26.7 |
| $Fe_2O_3$ | 11.9 |
| $MgO$ | 1.19 |
| $CaO$ | 2.60 |
| $TiO_2$ | 1.43 |
| $BaO$ | 0.12 |
| $SrO$ | 0.15 |
| $Na_2O$ | 0.62 |
| $K_2O$ | 1.55 |

I have found that between about one and a half to two weight percent of fly ash in a conventional corn meal type feed produces optimal results. By conventional corn mean type feed is meant feeds having a corn meal base and containing conventional poultry feed nutrients and additives. Typical broiler rations usually contain 50% or more corn meal. The optimum concentration is somewhat dependent upon the time of year. Thus, during the cold winter months, poultry tend to eat more than during the summer in order to keep warm. In these months, the optimum concentration of fly ash is closer to about 1.5 weight percent, while in the summer months the optimum concentration of fly ash is closer to about 2 weight percent.

This can be illustrated by the following experiments which dealt with the following basal chick ration:

|  | Percent |
|---|---|
| Dehydrated alfalfa leaf meal (20% protein) | 0.5 |
| Blood meal | 2.5 |
| Corn gluten meal (60% protein) | 6.0 |
| Yellow corn meal [1] | 57.425 |
| Corn fermentation solubles | 0.625 |
| Salt | 0.25 |
| Hydrolyzed vegetable and animal fat | 5.0 |
| Fish meal (65% protein) | 3.0 |
| Limestone | 0.425 |
| Meat and bone scrap (50% protein) | 4.0 |
| Dry fish solubles (SARD-X) | 0.5 |
| Soybean Oil meal (50% protein) | 19.20 |
| Trace minerals [2] | 0.1 |
| Vitamin mixture [3] | 0.3 |
| Coccidiostat [4] | 0.125 |
| Methionine hydroxy analog, calcium | 0.05 |
|  | 100.000 |

Footnotes at top of next column.

[1] Additions of fly ash to the basal ration were made in place of an equal weight of yellow corn meal, e.g. in the examples set forth below, a 1 weight percent fly ash feed contains 56.425 weight percent yellow corn meal, a 2 weight percent fly ash feed contains 55.425 weight percent yellow corn meal, etc. Vitamin mixture contains:

| Vitamin A | U.S.P. units per pound | 833,334 |
|---|---|---|
| Vitamin D₃ | International chick units per pound | 166,667 |
| Niacin | mg. per pound | 5,000 |
| d-Pantothenic acid | do | 1,667 |
| Vitamin B₁₂ activity | do | 2 |
| Vitamin E | International units per pound | 1,000 |
| Riboflavin | mg. per pound | 1,000 |
| Choline chloride | do | 106,667 |
| Ethoxyquin | gm. per pound | 22.6 |
| Folic acid | mg. per pound | 41.667 |
| Zinc | percent | 0.6608 |

Calculated nutrient composition of basal ration: Protein 25.02%, fat 8.35%, fiber 2.13%, nitrogen free extract 45.5%, ash 4.84%, calcium 0.81%, total phosphorus 0.58%, metabolizable energy 1500 calories per pound, methionine 0.51%, cystine 0.42%, lysine 1.33%, tryptophane 0.23%, arginine 1.45%, isoleucine 1.10%, valine 1.15%.

[2] Composition of trace mineral mixture—Ingredients: Cobalt carbonate, copper oxide, iron carbonate, calcium iodate, manganous oxide, zinc oxide, limestone flour. Trace mineral mixture contains: Cobalt 0.02%, copper 0.20%, iron 2.0%, iodine 0.12%, manganese 6.0%, zinc 0.01%, calcium 30%.

[3] Vitamin mixture contains: Vitamin A palmitate and d-activated animal sterol and dl alpha tocopheryl acetate protected with food starch modified with butylated hydroxy toluene and ethoxyquin (preservative); menadione sodium bisulfite complex; riboflavin supplement; niacin; calcium pantothenate; choline chloride, vitamin B₁₂ supplement; zinc oxide, folic acid; soybean hulls; corn cob fractions; certified color added; calcite.

[4] The coccidiostat used was Amprol Plus, which is a dry inert carrier containing uniformly dispersed therewithin 0.0125 weight percent of 1-(4-amino-2-n-propyl-5-pyrimidinyl methyl)-2 picolinium hydrochloride and 0.0016 weight percent of ethopabate-(methyl-4-acetamido-2-ethoxy benzoate).

The fly ash, whose analysis is given at page 4 of the specification, was used to replace the yellow corn meal to the extent indicated below. Such fly ash contained about 7 weight percent of carbon and 3.9 weight percent of moisture before ignition.

In the summer experiment set forth below, each pen contained about 30 chicks. The pens were randomly disposed in respect to each other so that no environmental effect due to pen location would result. The chicks used in the following experiments were broiler chickens bred for meat:

SUMMER EXPERIMENT

| Treatment | Pen number | Percent mortality | 4 weeks, weight pounds | 4 weeks, conversion [1] | 6 weeks, weight pounds | 0–6 weeks conversion [1] |
|---|---|---|---|---|---|---|
| Basal ration | 2 | 0 | 1.64 | 1.63 | 2.98 | 1.77 |
| Do | 8 | 6.5 | 1.56 | 1.67 | 2.83 | 1.86 |
| Do | 20 | 3.3 | 1.53 | 1.74 | 2.76 | 1.90 |
| Do | 24 | 0 | 1.51 | 1.78 | 2.74 | 1.89 |
| Average |  |  | 1.56 | 1.71 | 2.83 | 1.86 |
| 1% ash | 9 | 0 | 1.57 | 1.67 | 2.83 | 1.79 |
| Do | 11 | 3.3 | 1.61 | 1.70 | 2.89 | 1.83 |
| Do | 12 | 3.3 | 1.58 | 1.70 | 2.86 | 1.83 |
| Do | 18 | 0 | 1.60 | 1.65 | 2.88 | 1.83 |
| Average |  |  | 1.59 | 1.68 | 2.87 | 1.82 |
| 2% ash | 3 | 0. | 1.66 | 1.53 | 2.91 | 1.66 |
| Do | 5 | 0. | 1.75 | 1.53 | 2.85 | 1.82 |
| Do | 7 | 0. | 1.64 | 1.54 | 2.87 | 1.75 |
| Do | 14 | 0. | 1.57 | 1.69 | 2.94 | 1.77 |
| Average |  |  | 1.66 | 1.57 | 2.89 | 1.75 |
| 4% ash | 13 | 3.2 | 1.58 | 1.70 | 2.84 | 1.84 |
| Do | 16 | 0. | 1.62 | 1.64 | 2.91 | 1.81 |
| Do | 17 | 6.6 | 1.59 | 1.83 | 2.90 | 1.90 |
| Do | 22 | 0. | 1.54 | 1.68 | 2.82 | 1.83 |
| Average |  |  | 1.58 | 1.71 | 2.87 | 1.85 |

[1] Pounds of feed per pound of gain.

WINTER EXPERIMENT

| No. of chicks | Control, Treatment A | | 1% ash (H-3 supplement), Treatment B | | | 1.5% ash, Treatment C | | | 2.0% ash, Treatment D | | |
|---|---|---|---|---|---|---|---|---|---|---|---|
|  | Weight, pounds | F.E.[1] | No. of chicks | Weight, pounds | F.E.[1] | No. of chicks | Weight, pounds | F.E.[1] | No. of chicks | Weight, pounds | F.E.[1] |
| 30 | 1.51 | 1.88 | 31 | 1.58 | 1.70 | 31 | 1.62 | 1.75 | 29 | 1.61 | 1.86 |
| 30 | 1.55 | 1.75 | 29 | 1.58 | 1.77 | 31 | 1.60 | 1.66 | 28 | 1.53 | 1.76 |
| 29 | 1.49 | 1.73 | 28 | 1.54 | 1.82 | 31 | 1.62 | 1.67 | 29 | 1.55 | 1.74 |
| 28 | 1.53 | 1.89 | 29 | 1.54 | 1.72 |  |  |  | 29 | 1.60 | 1.75 |
| 30 | 1.53 | 1.75 | 25 | 1.53 | 1.84 | 27 | 1.60 | 1.82 | 30 | 1.55 | 1.70 |
| 30 | 1.54 | 1.71 |  |  |  | 27 | 1.58 | 1.73 | 29 | 1.56 | 1.77 |
| Average | 1.53 | 1.79 |  | 1.55 | 1.77 |  | 1.60 | 1.73 |  | 1.57 | 1.76 |

[1] Pounds of feed per pound of gain.

It is seen that during the summer the optimum weight percent of the fly ash is about 2.0 weight percent, whereas during the winter the optimum weight percent of the fly ash is about 1.5 weight percent. This is in keeping with the fact that during the winter the birds require a larger number of calories to keep warm.

The rate of growth and the ratio of pounds of feed per pound of gain in respect to the optimum weight percentages of fly ash is deemed to be statistically significant.

It will be understood by one of ordinary skill in the art that the amount of feed ingested by meat-bearing animals is largely dependent upon the energy content of the feed. Thus, by way of example, raising the fat level of the feed will convert the feed to high energy level feed. This will result in smaller amounts of feed being ingested. As a result, the weight percentage of the fly ash in such feed should be higher, i.e. as much as about 5 weight percent.

Conversely, where the feed has a relatively low energy content level and is largely a carrier for vitamins, larger amounts of feed will be ingested. In such cases the fly ash content should be lower, i.e. as low as about ½ weight percent.

The chicken feeds of the present invention may be prepared by using conventional dry blending equipment to uniformly disperse the ash within the pulverized powdered feed. The resultant uniform blend may then be pelletized in conventional pelletizing machines.

By maintaining the fly ash particle size between 20 mesh and 200 mesh, I have determined that the chicken feed is relatively easy to pelletize using high-speed pelletizing machinery. Thus, the presence of the fly ash reduces the tendency of corn meal base chicken feeds to clog the pelleting machines, and serves to maintain such machines relatively clean.

To demonstrate the improved pelleting of corn meal base chicken feeds of the present invention containing a small percentage of fly ash, the following experiment was performed:

One weight percent of fly ash (20 pounds of fly ash per ton of corn meal base chicken feed) was uniformly dispersed in a corn meal ration of the following composition by substituting fly ash for an equal weight of corn:

| | Parts by weight |
|---|---|
| Corn | 2931.1 |
| 50% protein soybean meal | 799.5 |
| Corn gluten meal | 350.0 |
| Menhaden fish meal | 306.9 |
| Animal and vegetable fat | 300.0 |
| Meat and bone scrap 50% protein | 121.8 |
| High lysine supplement | 45.0 |
| Poultry by-products meal | 25.0 |
| Limestone | 17.4 |
| Alfalfa leaf meal 22% protein | 15.8 |
| Distillers grains and solubles | 15.0 |
| Vitamin premix | 15.0 |
| Salt | 14.5 |
| Trace mineral mixes | 15.0 |
| Defluorinated rock phosphate | 10.0 |
| Sodium propionate | 7.5 |
| Coccidiostat mix (Amprol Plus) | 10.5 |
| | 5000. |

The fly ash had a sieve analysis after grinding approximately the same as that shown at page 3 of the specification and had the following composition analysis after ignition at 950° C. for one hour:

| Oxide: | Weight percent |
|---|---|
| $P_2O_5$ | 0.13 |
| $SiO_2$ | 42.79 |
| $Fe_2O_3$ | 14.07 |
| $Al_2O_3$ | 30.81 |
| $TiO_2$ | 3.98 |
| MgO | 0.98 |
| $SO_3$ | 3.63 |
| $Na_2O$ | 2.56 |
| $K_2O$ | 0.96 |
| Difference undetermined | 0.09 |
| | 100.00 |

Comparative tests using the above corn meal base chicken feed composition with and without the fly ash added were run on a Sprout Waldron pellet machine which produced cylindrical pellets of approximately 3/16 inch diameter by 3/8 inch height. The feed composition containing the 1 weight percent fly ash showed a 15 percent increase in the pelletization rate over the identical composition without the fly ash substituted. This is considered a significant improvement since the pelletizing procedure of corn meal feed is a serious commercial problem which requires more time than the blending of the components making up the feed. Such pellets yield feed results similar to those shown in the above examples.

While I have referred to the feed of the present invention as "chicken feed," because that is the conventional name for this type of feed, I believe that the chicken feeds of the present invention have utility with other forms of poultry, such as ducks and turkeys, and may be used with other meat-source animals, such as swine.

The present invention may be embodied in other specific forms without departing from the spirit or essential attributes thereof, and accordingly, reference should be made to the appended claims, rather than to the foregoing specification as indicating the scope of the invention.

I claim:

1. An easily pelletizable corn meal base chicken feed comprising a mixture of conventional poultry feed nutrients and additives and from about ½ to 5 weight percent of fly ash uniformly disposed in said feed, with said fly ash consisting essentially of particles in the 20 to 200 mesh size range, and with the fly ash having an analysis within the following range after being ignited at 950° C. for one hour:

| Oxide: | Weight percent |
|---|---|
| $SiO_2$ | 25–80 |
| $Al_2O_3$ | 1.5–50 |
| $Fe_2O_3$ | 5–22 |
| MgO | 0.5–3 |
| CaO | 0–6 |
| $TiO_2$ | 0.5–4 |
| BaO | 0–1 |
| SrO | 0–1 |
| $SO_3$ | 0–10 |
| $Na_2O$ | 0–10 |
| $P_2O_5$ | 0–5 |
| $K_2O$ | 0.5–4 |

2. A corn meal base chicken feed in accordance with claim 1 wherein the fly ash concentration is between about 1½ and 2 weight percent.

3. A corn meal base chicken feed in accordance with claim 1 wherein the conventional amount of corn meal present in the feed is reduced proportionately to the weight of fly ash added.

4. A corn meal base chicken feed in accordance with claim 5 wherein the fly ash concentration is between about 1½ and 2 weight percent.

5. A corn meal base chicken feed in accordance with claim 1 which includes about one half to two weight percent based on the weight of the fly ash of a non-toxic, viscous organic liquid selected from the group consisting of propylene glycol, white mineral oil and melted saturated animal fat, said organic liquid functioning as a binder for the fly ash.

References Cited

UNITED STATES PATENTS 1,399,206  12/1921  Gallagher  99—4
3,271,161  9/1966  Eshleman  99—4

OTHER REFERENCES

Faber et al.: Bureau of Mines Information Circular 8348; p. 49, 967.

ALBERT T. MEYERS, Primary Examiner

A. J. ROBINSON, Assistant Examiner

U.S. Cl. X.R.

99—2 G, 4; 424—125, 128, 167